(12) United States Patent
Yotsumoto et al.

(10) Patent No.: US 11,697,161 B1
(45) Date of Patent: Jul. 11, 2023

(54) FASTENING STRUCTURE OF ULTRASONIC RESONATOR AND ULTRASONIC MACHINING DEVICE

(71) Applicant: TAKADA CORPORATION, Kitakyushu (JP)

(72) Inventors: Keiichi Yotsumoto, Kitakyushu (JP); Nobuhiro Mori, Kitakyushu (JP); Hironobu Matsuyama, Kitakyushu (JP)

(73) Assignee: TAKADA CORPORATION, Kitakyushu (JP)

( * ) Notice: Subject to any disclaimer, the term of this patent is extended or adjusted under 35 U.S.C. 154(b) by 0 days.

(21) Appl. No.: 17/928,390

(22) PCT Filed: Jul. 15, 2022

(86) PCT No.: PCT/JP2022/027884
§ 371 (c)(1),
(2) Date: Nov. 29, 2022

(87) PCT Pub. No.: WO2023/032487
PCT Pub. Date: Mar. 9, 2023

(30) Foreign Application Priority Data

Sep. 3, 2021 (JP) .................. 2021-143970

(51) Int. Cl.
*B23B 31/11* (2006.01)
*B06B 3/00* (2006.01)
(52) U.S. Cl.
CPC ............... *B23B 31/11* (2013.01); *B06B 3/00* (2013.01)
(58) Field of Classification Search
CPC ......... B23B 31/11; B06B 3/00; F16B 5/0275; Y10T 279/15; Y10T 279/17931
(Continued)

(56) References Cited

U.S. PATENT DOCUMENTS 1,401,621 A * 12/1921 Loudon .................. F02P 5/02
403/299
2,678,226 A * 5/1954 White .................... F16G 11/12
411/315
(Continued)

FOREIGN PATENT DOCUMENTS

EP 1669148 A1 6/2006
JP S48-104192 A 12/1973
(Continued)

OTHER PUBLICATIONS

Notice of Reasons for Refusal dated Nov. 24, 2021, issued in counterpart JP Application No. 2021-143970, with machine translation. (6 pages).
(Continued)

*Primary Examiner* — Eric A. Gates
(74) *Attorney, Agent, or Firm* — WHDA, LLP

(57) ABSTRACT

A female screw portion 24 is formed over the entire length of a through hole 23 passing through an axis of an ultrasonic horn 13, first and second male screw portions 25, 26 formed on the ultrasonic horn 13 side of axes of first and second boosters 14, 15 are screwed into the female screw portion 24, the ultrasonic horn 13 and the first and second boosters 14, 15 are fastened coaxially, leading ends 27, 28 of the first and second male screw portions 25, 26 are not in contact with each other inside the through hole 23, and a cutting blade 12 is attached to an outer periphery of a base portion 20 of the ultrasonic horn 13 having a space portion 29 surrounded by an inner wall of the through hole 23 and the leading ends 27, 28 of the first and second male screw portions 25, 26.

12 Claims, 3 Drawing Sheets

(58) Field of Classification Search
USPC .................................................. 403/299, 307
See application file for complete search history.

(56) References Cited

U.S. PATENT DOCUMENTS

| | | | | |
|---|---|---|---|---|
| 2,696,397 A | * | 12/1954 | Booth ..................... | B21D 53/00 |
| | | | | 403/46 |
| 2,845,288 A | * | 7/1958 | Cierpik, Jr. ............. | F16G 11/12 |
| | | | | 403/46 |
| 2,905,491 A | * | 9/1959 | Olson ..................... | F16G 11/12 |
| | | | | 403/44 |
| 4,905,760 A | * | 3/1990 | Gray ....................... | B05D 1/24 |
| | | | | 285/55 |
| 5,096,532 A | * | 3/1992 | Neuwirth .......... | B29C 66/73921 |
| | | | | 228/1.1 |
| 6,098,514 A | * | 8/2000 | Sato ....................... | B26D 7/086 |
| | | | | 83/425.3 |
| 6,880,224 B2 | * | 4/2005 | Colarusso ................ | E04C 5/03 |
| | | | | 403/307 |

FOREIGN PATENT DOCUMENTS

| | | |
|---|---|---|
| JP | S54-35183 U | 3/1979 |
| JP | H10-211589 A | 8/1998 |
| JP | 2002-035695 A | 2/2002 |
| JP | 2007-015095 A | 1/2007 |
| JP | 2007-049044 A | 2/2007 |
| JP | 2018-126967 A | 8/2018 |
| KR | 97-0061442 A | 9/1997 |

OTHER PUBLICATIONS

Decision to Grant a Patent dated Mar. 15, 2022, issued in counterpart JP Application No. 2021-143970, with machine translation. (5 pages).

International Search Report dated Aug. 30, 2022, issued in counterpart Application No. PCT/JP2022/027884, with machine translation. (6 pages).

Office Action dated Mar. 2, 2023, issued in counterpart KR application No. 10-2022-7040892, with English translation (3 pages).

* cited by examiner

FASTENING STRUCTURE OF ULTRASONIC RESONATOR AND ULTRASONIC MACHINING DEVICE

TECHNICAL FIELD

The present invention relates to a fastening structure of an ultrasonic resonator in an ultrasonic machining device mainly used for machining a hard and brittle material (such as SiC and alumina) of a semiconductor wafer, etc., and an ultrasonic machining device including an ultrasonic resonator which is fastened by the fastening structure.

BACKGROUND ART

Conventionally, an ultrasonic machining device that, while causing ultrasonic oscillation of an ultrasonic resonator in which first and second boosters are respectively coaxially fastened with screws on both sides of a disc-shaped ultrasonic horn (R/L converter) in the axial direction, rotates the fastening axis and performs ultrasonic machining such as cutoff is known. Various methods (structures) for fastening this ultrasonic horn and the first and second boosters coaxially (on the same axis) are proposed. For example, Patent Literature 1 proposes that, in a resonator in which an ultrasonic horn and boosters having support portions (first and second boosters) are combined in a coaxial row by a central screw, a fitting means including an annular groove placed on a single circumference centered on the screw and a projection fitted into the annular groove is provided in both mating surfaces of the ultrasonic horn and the boosters.

Patent Literature 2 proposes that a bolt member is inserted through a foundation portion through hole provided in a foundation portion of a cut blade and screwed into a screw hole formed in a leading end portion of a spindle, and at the time of fastening and fixing the cut blade and the leading end portion of the spindle, the bolt member and an inner wall of the foundation portion through hole are held in a non-contact state. In addition, Patent Literature 2 describes an attachment assistance tool used for fastening with aligning axes of the cut blade and the leading end portion of the spindle, and a spacer.

CITATION LIST

Patent Literature

Patent Literature 1: Japanese Published Unexamined Patent Application No. 2002-035695
Patent Literature 2: Japanese Published Unexamined Patent Application No. 2007-015095
Patent Literature 3: Japanese Published Unexamined Utility Model Application No. S54-35183

SUMMARY OF INVENTION

Technical Problem

Patent Literature 1 aims to improve the accuracy of coaxial coupling of the ultrasonic horn and the boosters on both sides (first and second boosters) by the fitting means including the annular groove and the projection fitted into the annular groove. However, at the time of machining screw holes and the annular grooves on both sides of the ultrasonic horn (mating surfaces with the boosters), there is a need for switching one side of the ultrasonic horn with the other side and machining the surfaces separately. Due to this switching, position misalignment (center misalignment) is respectively caused in the screw holes and the annular grooves on both sides of the ultrasonic horn, and there is a problem that it is difficult to accurately align axes of the ultrasonic horn and the boosters on both sides.

In Patent Literature 2, the foundation portion through hole is provided in the foundation portion of the cut blade. Thus, not only an outer peripheral surface of the foundation portion but also the inner wall (inner peripheral surface) of the foundation portion through hole are expanded and contracted (oscillated) in the radial direction. Therefore, there is a need for accurately positioning (centering) the cut blade and the spindle at the time of fastening the cut blade and the spindle by the bolt member, inserting the bolt member through the foundation portion through hole without decentering, and forming a gap which is uniform over the entire circumference between an outer peripheral surface of the bolt member and the inner wall of the foundation portion through hole, so that the outer peripheral surface of the bolt member and the inner wall of the foundation portion through hole can be held in a non-contact state (do not interfere with each other) even when oscillation is generated. Thus, positioning is performed by the exclusive attachment assistance tool. However, every time the cut blade as a consumable item is replaced with a new one, a troublesome centering work has to be performed, and there is a problem that maintainability is remarkably poor.

As in Patent Literature 2, in a cantilever support structure in which the spindle (booster) is rotatably supported by an air bearing, when axes of the cut blade (ultrasonic horn) and the spindle are misaligned, whirling is caused on the non-support side, the cut blade cannot be rotated at high speed, and machining performance is lowered. In addition, by forcibly rotating at high speed, there is a possibility that the ultrasonic resonator and the bearing are broken. Further, since the cut blade (ultrasonic horn) is fixed by a penetrating bolt while being sandwiched by the leading end portion of the spindle and the spacer from both sides, a compressive stress is applied in the axial direction of the cut blade, and in a resonance state, an internal stress generated by resonance is added, so that there is also a possibility that the cut blade is broken.

Further, in both-end support structure in which the boosters on both sides of the ultrasonic horn are respectively rotatably supported by air bearings, every time the ultrasonic horn is replaced with a new one, there is a need for centering the air bearings while adjusting air gaps between the respective air bearings and the boosters in accordance with misalignment of the axes of the ultrasonic horn and the boosters on both sides, and maintainability is poor. In addition, particularly in a case where misalignment of the axes is large, the air gaps between the respective air bearings and the boosters cannot be adjusted, and there is a problem that the ultrasonic horn itself cannot be used.

From the circumstances described above, realization of a fastening structure with which an ultrasonic horn and first and second boosters can be fastened accurately, easily, and coaxially (on the same axis) has been demanded.

Here, in a Langevin-type transducer for high amplitudes disclosed in Patent Literature 3, in a central hole provided in a front surface plate to pass through, a screw hole (female screw portion) for screwing a bolt of a male screw serving as a clamping member is provided from the inner end side (one end side), and a screw hole (female screw portion) for coupling a horn, etc., is provided from the outer end side (other end side), so that a portion of at least 5 mm or more where no female screw is provided exists between the screw hole (female screw portion) on one side and the screw hole (female screw portion) on the other side. Thereby, it is possible to fix an electrostrictive element and a backing plate to one side of the front surface plate by a bolt, and screw and attach the horn, etc., to the other side of the front surface plate.

However, this Langevin-type transducer for high amplitudes is a drive source for transmitting oscillation (displacement) generated in the electrostrictive element in the axial direction of the Langevin-type transducer for high amplitudes, amplifying the oscillation with the horn, etc., on the other side, and outputting the oscillation but does not convert and utilize oscillation in the axial direction into oscillation in the radial direction unlike an R/L converter such as the ultrasonic horn used in the ultrasonic machining device described above. Therefore, a cutting blade (rotating blade) is not attached and used to an outer periphery of the Langevin-type transducer for high amplitudes (front surface plate), and the Langevin-type transducer for high amplitudes itself is also not rotatably supported by a bearing. Thus, there is no need for accurately and coaxially positioning the electrostrictive element and the backing plate on one side and the horn, etc., on the other side with respect to the front surface plate.

In the Langevin-type transducer, when a high-frequency voltage is applied to the electrostrictive element formed by a ring-shaped piezoelectric element, the electrostrictive element (piezoelectric element) is oscillated, and a thickness thereof is periodically changed. Thereby, a stress change is caused in the Langevin-type transducer clamped by the bolt, and ultrasonic oscillation is generated in a state where an oscillation frequency and a natural oscillation frequency of the Langevin-type transducer are aligned, that is, in a resonance state. As a result, half-wave standing waves with positions of a surface of the front surface plate on the outer end side and a surface of the backing plate on the outer end side serving as antinodes and a position of the electrostrictive element serving as a node exist in the fastening axis direction of the Langevin-type transducer. At this time, in order to prevent interference between an inner peripheral surface of a central hole of the ring-shaped electrostrictive element and the bolt passing through the central hole of the electrostrictive element due to oscillation of the electrostrictive element serving as the node, a hole diameter of the central hole of the electrostrictive element is formed to be larger than an outer diameter of the bolt, and a gap is provided between the inner peripheral surface of the central hole of the electrostrictive element and an outer peripheral surface of the bolt. From this, it is clear that the front surface plate, the electrostrictive element, and the backing plate are not coaxially positioned. Meanwhile, in an ultrasonic machining device, oscillation in the axial direction generated with an ultrasonic transducer serving as a drive source is converted into oscillation in the radial direction by an ultrasonic horn serving as an R/L converter, and while oscillating a cutting blade attached to an outer periphery of the ultrasonic horn in the radial direction, an ultrasonic resonator is rotated on an axis and ultrasonic machining is performed. Therefore, in the ultrasonic machining device, there is a need for not only accurately positioning the axes of the ultrasonic horn and first and second boosters and coaxially fastening, but also properly setting a shape of the ultrasonic horn and an attachment position of the cutting blade with respect to the ultrasonic horn, etc., so that the cutting blade is efficiently oscillated. However, in the Langevin-type transducer for high amplitudes in which a cutting blade cannot be attached, these are not considered.

The present invention was made in view of the above circumstances, and an object thereof is to provide a fastening structure of an ultrasonic resonator excellent in maintainability, durability, and operational stability with a simple configuration, high dimensional accuracy, and easy assembling and disassembling, and an ultrasonic machining device capable of stably rotating an ultrasonic resonator at high speed and efficiently performing ultrasonic machining, the ultrasonic machining device being excellent in quiet performance and energy saving performance.

Solution to Problem

A fastening structure of an ultrasonic resonator according to a first invention meeting the object described above is a fastening structure of an ultrasonic resonator having an ultrasonic horn which includes a cutting blade on an outer periphery, and first and second boosters respectively coupled to one side and the other side of the ultrasonic horn in the axial direction, the ultrasonic resonator that, by ultrasonic standing waves generated with an ultrasonic transducer coupled to a free end surface of any one of the first and second boosters as a drive source, while oscillating the ultrasonic horn serving as an R/L converter in the radial direction which is orthogonal to the axial direction of the ultrasonic horn, rotates on an axis of the ultrasonic horn and performs ultrasonic machining, wherein the ultrasonic horn has a base portion, first and second projecting portions respectively formed on one side and the other side of the base portion in the axial direction, a through hole passing through the ultrasonic horn in the axial direction through axes of the base portion and the first and second projecting portions, and female screw portions respectively formed from opening ends on both sides of the through hole by predetermined lengths or a female screw portion formed over the entire length of the through hole, the first booster has a first male screw portion formed or attached on the ultrasonic horn side of an axis of the first booster and screwed into the female screw portion, the second booster has a second male screw portion formed or attached on the ultrasonic horn side of an axis of the second booster and screwed into the female screw portion, the ultrasonic horn and the first and second boosters are fastened coaxially while aligning the respective axes with each other, leading ends of the first and second male screw portions are not brought into contact with each other inside the through hole, a space portion surrounded by an inner wall of the through hole and the leading ends of the first and second male screw portions is formed in the axis of the ultrasonic horn, a position of a node of the standing waves overlaps with the space portion in an axially center portion of the base portion, and the cutting blade is attached to an outer periphery of the base portion.

Here, the cutting blade (rotating blade) is supplied in a state of being fixed to the base portion of the ultrasonic horn. Thus, in a case where abrasion or damage is caused to the cutting blade, the ultrasonic horn and the first and second boosters are unfastened, the used ultrasonic horn (where abrasion or damage is caused to the cutting blade) is replaced with a new ultrasonic horn (where no abrasion or damage is caused to a cutting blade).

In the fastening structure of the ultrasonic resonator according to the first invention, preferably, a length of the first male screw portion is formed to be not more than an axial length of the first projecting portion, a length of the second male screw portion is formed to be not more than an axial length of the second projecting portion, and the space portion passes through the base portion in the axial direction and has an axial length equal to or more than an axial length of the base portion.

In the fastening structure of the ultrasonic resonator according to the first invention, preferably, an axial length of the ultrasonic horn is equal to one half of a wavelength of the standing waves, and an axial length of each of the first and second boosters is equal to the natural-number multiple of one half of the wavelength of the standing waves.

In the fastening structure of the ultrasonic resonator according to the first invention, preferably, the first and second projecting portions are respectively formed into a columnar shape, a diameter and an axial length of the first projecting portion are respectively equal to a diameter and an axial length of the second projecting portion, and a diameter of the through hole is within a range from one tenth to one half of the diameter of each of the first and second projecting portions.

An ultrasonic machining device according to a second invention meeting the object described above includes the fastening structure of the ultrasonic resonator according to the first invention.

In the ultrasonic machining device according to the second invention, the ultrasonic resonator can be cantilevered and supported by a bearing portion that rotatably holds only any one of the first and second boosters to which the ultrasonic transducer is coupled. Here, an air bearing is favorably used as the bearing portion.

In the ultrasonic machining device according to the second invention, the ultrasonic resonator can be supported on both sides by first and second bearing portions that respectively rotatably hold the first and second boosters. Here, an air bearing is favorably used as any one of or both the first and second bearing portions.

Effects of Invention

With the fastening structure of the ultrasonic resonator according to the first invention, by forming the female screw portion into which the first and second male screw portions provided in the axes of the first and second boosters are screwed in the through hole provided in the axis of the ultrasonic horn, it is possible to highly accurately align the axes of the ultrasonic horn and the first and second boosters, fasten these easily, reliably, and coaxially, and prevent whirling of the ultrasonic resonator at the time of rotation. Since the leading ends of the first and second male screw portions are not brought into contact with each other inside the through hole and the space portion passing through the base portion in the axial direction is formed in the axis of the ultrasonic horn, it is possible to increase amplitudes in the radial direction in the base portion of the ultrasonic horn and efficiently perform machining with the cutting blade attached to the outer periphery of the base portion. Thus, it is possible to enhance utilization efficiency of energy generated by the ultrasonic transducer. Moreover, the first and second male screw portions are not brought into contact, and do not interfere with each other due to oscillation generated in the ultrasonic resonator at the time of machining. Thus, it is possible to prevent generation of abnormal noise, and effectively prevent breakage of the through hole and the first and second male screw portions due to abrasion, etc.

With the fastening structure of the ultrasonic resonator according to the first invention, the node of the standing waves exists in the axially center portion of the base portion. Thus, in a case where the axial length of the ultrasonic horn is equal to one half of the wavelength of the standing waves, and the axial length of each of the first and second boosters is equal to the natural-number multiple of one half of the wavelength of the standing waves, it is possible to align the position of the node with an attachment position of the cutting blade, effectively utilize ultrasonic oscillation generated in the ultrasonic resonator, and efficiently generate oscillation in the radial direction of the cutting blade.

With the fastening structure of the ultrasonic resonator according to the first invention, in a case where the first and second projecting portions are respectively formed into a columnar shape, the diameter and the axial length of the first projecting portion are respectively equal to the diameter and the axial length of the second projecting portion, and the diameter of the through hole is within the range from one tenth to one half of the diameter of each of the first and second projecting portions, the inner wall of the through hole has sufficient durability, and it is possible to form the space portion. In addition, even when the female screw portion is formed along the through hole, it is possible to ensure a sufficient thickness between the diameters (outer diameters) of the first and second projecting portions and the outer diameter (root diameter) of the female screw portion, and prevent breakage (cracking) of the first and second projecting portions.

Since the ultrasonic machining device according to the second invention includes the fastening structure of the ultrasonic resonator according to the first invention, it is possible to effectively utilize ultrasonic oscillation and efficiently perform machining with the cutting blade attached to the outer periphery of the ultrasonic horn (base portion). Thus, it is excellent in quiet performance and energy saving performance.

In the ultrasonic machining device according to the second invention, even in a case where only any one of the first and second boosters to which the ultrasonic transducer is coupled is rotatably held by the bearing portion and the ultrasonic resonator is cantilevered and supported, by the ultrasonic horn and the first and second boosters being positioned and fastened coaxially and accurately, whirling is not caused on the non-support side. Thus, it is possible to rotate the ultrasonic resonator at high speed and prevent machining performance from lowering.

In the ultrasonic machining device according to the second invention, even in a case where the first and second boosters are respectively rotatably held by the first and second bearing portions and the ultrasonic resonator is supported on both sides, the ultrasonic horn and the first and second boosters are positioned and fastened coaxially and accurately by the through hole. Thus, there is no need in particular for centering the ultrasonic resonator (first and second boosters) and the first and second bearing portions, and it is excellent in assembling workability and maintainability.

DESCRIPTION OF EMBODIMENTS

Next, with reference to the attached drawings, an embodiment of the present invention will be described to provide for understanding of the present invention.

Figure 1:
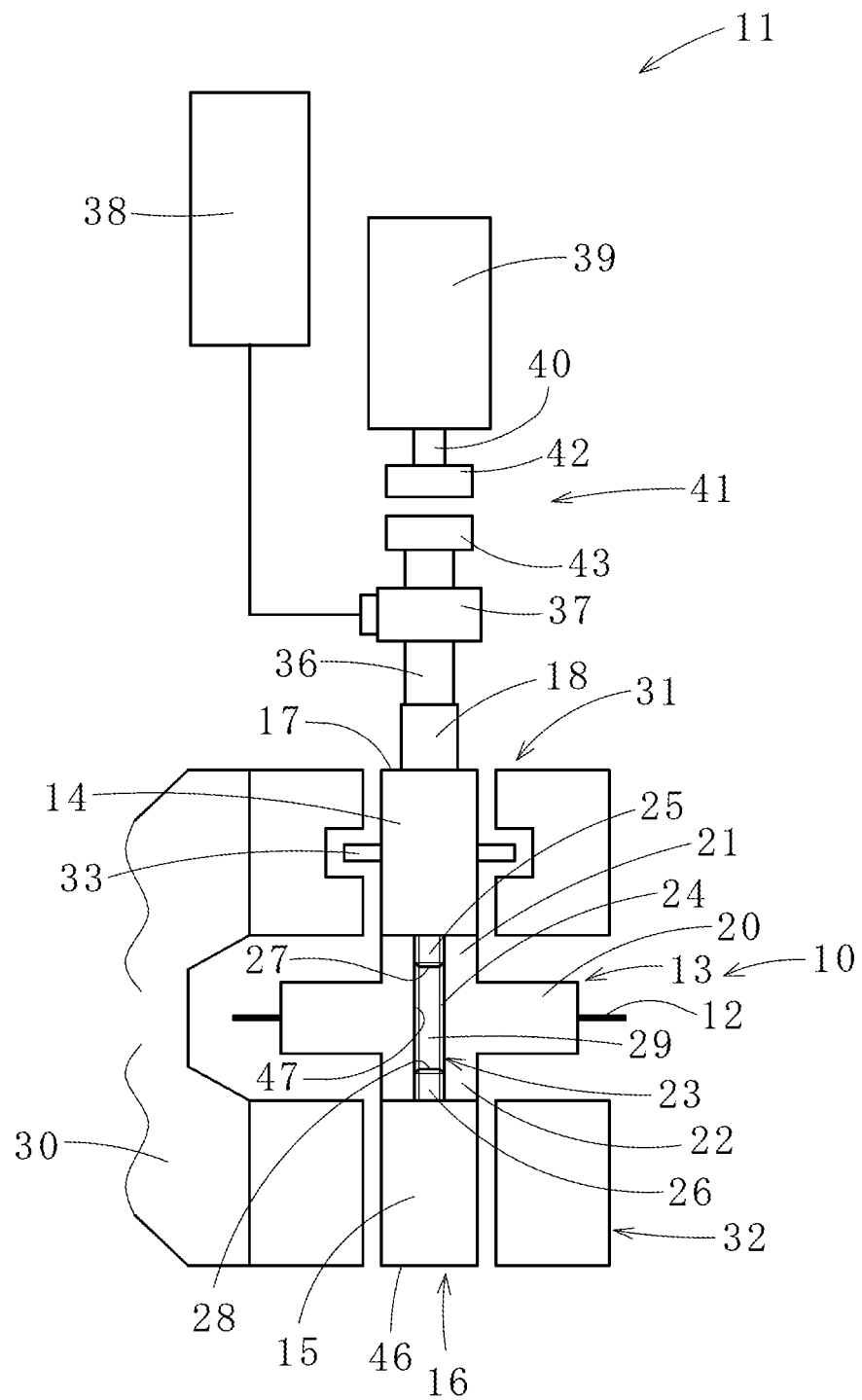
FIG. 1 is a partially sectional front view illustrating a major part of an ultrasonic machining device which includes a fastening structure of an ultrasonic resonator according to an embodiment of the present invention.
Figure 2:
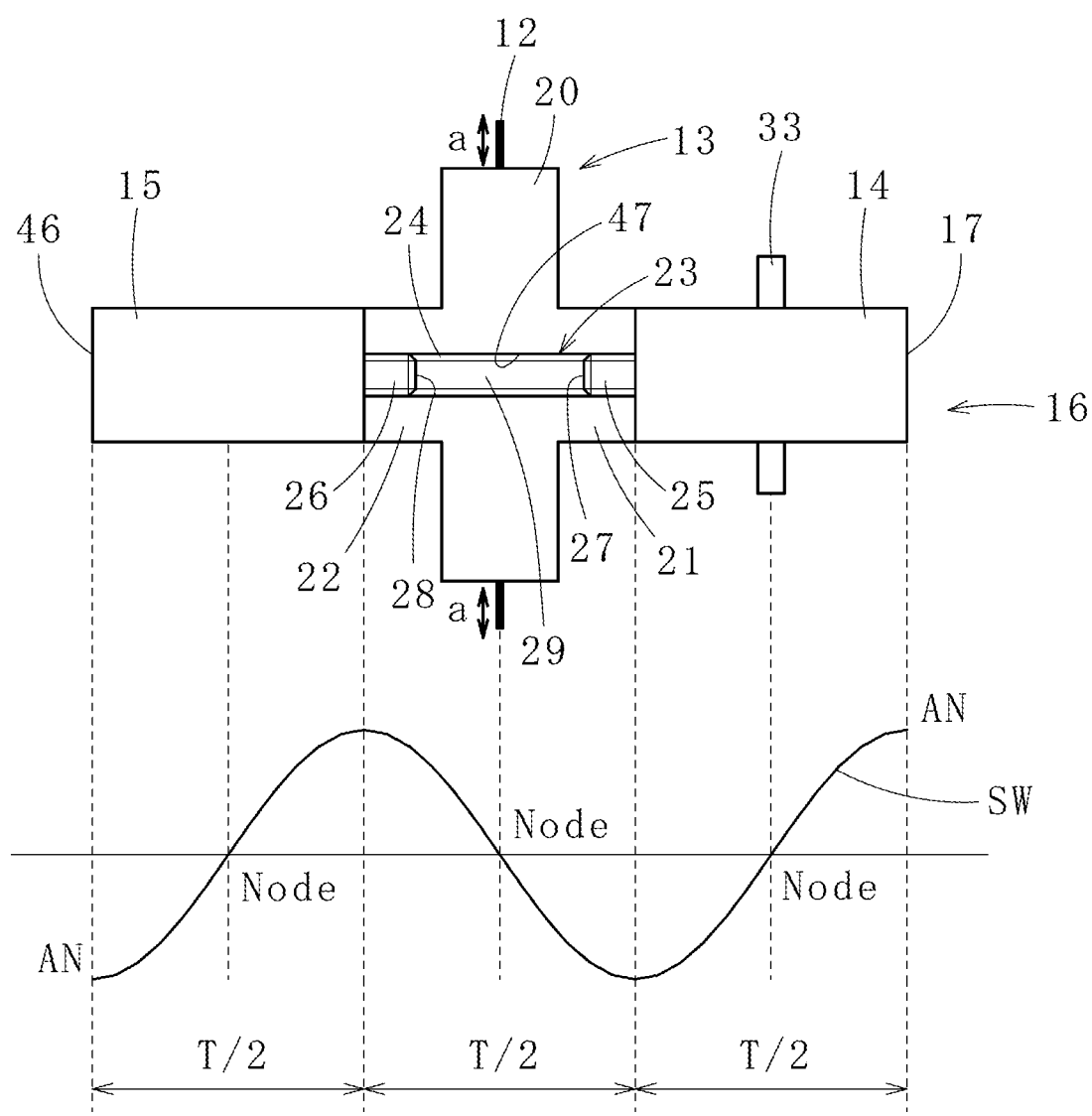
FIG. 2 is an explanatory view illustrating a state of standing waves generated in the ultrasonic resonator of the ultrasonic machining device.

An ultrasonic machining device 11 of FIG. 1 including a fastening structure 10 of an ultrasonic resonator according to the embodiment of the present invention illustrated in FIGS. 1 and 2 performs machining (cutoff, cutting, grinding, etc.) of a hard and brittle material such as SiC and alumina with a cutting blade (a type of machining tool) 12 that rotates while performing ultrasonic oscillation in the radial direction.

As illustrated in FIGS. 1 and 2, in the fastening structure 10 of the ultrasonic resonator, an ultrasonic resonator 16 is configured by coupling column-shaped first and second boosters 14, 15 respectively to one side and the other side of an ultrasonic horn 13 in the axial direction, which has the cutting blade 12 attached to its outer periphery. By ultrasonic standing waves SW (oscillation in the axial direction) generated with an ultrasonic transducer (such as an electrostrictive vibrator) 18 coupled to a free end surface 17 (upper end surface herein) of the first booster 14 as a drive source, this ultrasonic resonator 16 rotates on an axis of the ultrasonic horn 13 and performs ultrasonic machining while oscillating the ultrasonic horn 13 serving as an R/L converter in the radial direction (direction of an arrow a of FIG. 2) which is orthogonal to the axial direction of the ultrasonic horn 13.

The ultrasonic horn 13 has a disc-shaped base portion 20, first and second projecting portions 21, 22 projecting respectively on one side and the other side of the base portion 20 in the axial direction, the first and second projecting portions being formed into a columnar shape having a smaller diameter than the base portion 20, a through hole 23 passing through the ultrasonic horn 13 in the axial direction through axes of the base portion 20 and the first and second projecting portions 21, 22, and a female screw portion 24 formed over the entire length of the through hole 23.

At this time, a diameter and an axial length of the first projecting portion 21 are respectively equal to a diameter and an axial length of the second projecting portion 22 (the first projecting portion 21 and the second projecting portion 22 have the same shape), and the axes of the base portion 20 and the first and second projecting portions 21, 22 are aligned with each other, and the base portion 20 and the first and second projecting portions 21, 22 are arranged coaxially. The diameters of the first and second projecting portions 21, 22 are preferably not more than one fourth of a wavelength 2\, when ultrasonic waves used propagate through the ultrasonic horn 13. However, the diameters are not limited to this but appropriately selected. The first booster 14 has a first male screw portion 25 formed on the ultrasonic horn 13 side of an axis of the first booster 14 and screwed into the female screw portion 24 so as to be not more than the axial length of the first projecting portion 21. The second booster 15 has a second male screw portion 26 formed on the ultrasonic horn 13 side of an axis of the second booster 15 and screwed into the female screw portion 24 so as to be not more than the axial length of the second projecting portion 22.

Therefore, in this fastening structure 10 of the ultrasonic resonator, only by screwing the first and second male screw portions 25, 26 into the female screw portion 24 formed in the through hole 23, the ultrasonic horn 13 and the first and second boosters 14, 15 are fastened coaxially with the axes being aligned with each other accurately, leading ends 27, 28 of the first and second male screw portions 25, 26 are not brought into contact with each other inside the through hole 23, and a space portion 29 surrounded by an inner wall of the through hole 23 and the leading ends 27, 28 of the first and second male screw portions 25, 26 is formed in the axis of the ultrasonic horn 13. This space portion 29 passes through the base portion 20 in the axial direction, and has an axial length equal to or more than an axial length of the base portion 20. The cutting blade 12 is attached to an outer periphery of the base portion 20. The lengths of the first and second male screw portions are different depending on the axial lengths of the first and second projecting portions but appropriately selected within a range where the ultrasonic horn and the first and second boosters can be reliably fastened and held (fixed).

Here, a diameter of the through hole 23 is preferably within a range from one tenth to one half of the diameter of each of the first and second projecting portions 21, 22. Since the diameter of the through hole 23 is not less than one tenth of the diameter of each of the first and second projecting portions 21, 22, the first and second male screw portions 25, 26 are screwed into the female screw portion 24 formed in the through hole 23, so that the ultrasonic horn 13 and the first and second boosters 14, 15 are firmly fixed, and in addition, the sufficient space portion 29 is formed in the base portion 20, so that it is possible to enhance oscillation efficiency in the ultrasonic horn 13. Since the diameter of the through hole 23 is not more than one half of the diameter of each of the first and second projecting portions 21, 22, the inner wall (peripheral wall) of the through hole 23 has sufficient durability and it is possible to form the space portion 29. Even when the female screw portion 24 is formed along the through hole 23, it is possible to ensure a sufficient thickness between the diameters (outer diameters) of the first and second projecting portions 21, 22 and the outer diameter (root diameter) of the female screw portion 24, and prevent breakage (cracking) of the first and second projecting portions 21, 22.

As illustrated in FIG. 2, the axial length of the ultrasonic horn 13 is equal to one half of a wavelength T of the standing waves SW generated in the ultrasonic resonator 16 (T/2), and an axial length of each of the first and second boosters 14, 15 is equal to one half of the wavelength T of the standing waves (T/2). Here, the ultrasonic horn 13 and the first and second boosters 14, 15 may be made of the same material in order to make uniform a propagation capability of ultrasonic waves, or may be made of different materials and a combination of the materials can be appropriately selected. A ratio between the axial length of the base portion and the axial length of each of the first and second projecting portions in the ultrasonic horn is appropriately selected.

As illustrated in FIG. 1, the ultrasonic machining device 11 has first and second bearing portions 31, 32 that respectively rotatably hold the first and second boosters 14, 15 with respect to a holder 30, and supports the ultrasonic resonator 16 on both sides. Here, the first and second bearing portions 31, 32 are air (gas) bearings. Although a flange-shaped support portion 33 is formed as a thrust air bearing on an outer periphery of the first booster 14, structures of the first and second bearing portions (air bearings) 31, 32 are appropriately selected. The support portion 33 is preferably integrated with the first booster 14 but a support portion 33 made of a separate member may be attached.

The female screw portion 24 into which the first and second male screw portions 25, 26 are screwed is formed along the single through hole 23. Thus, at the time of screwing the first and second male screw portions 25, 26 into the female screw portion 24, axes of the first and second male screw portions 25, 26 are not misaligned on one side and the other side of the ultrasonic horn 13 (through hole 23) in the axial direction, and it is possible to fasten the ultrasonic horn 13 and the first and second boosters 14, 15 accurately and coaxially. As a result, there is no need for a centering work at the time of supporting (holding) the ultrasonic resonator 16 (first and second boosters 14, 15) by the first and second bearing portions 31, 32. That is, there is no need for performing a troublesome centering work (position adjustment) every time the ultrasonic horn 13 as a consumable item is replaced with a new one. Thus, maintainability is improved.

As illustrated in FIG. 1, in the ultrasonic machining device 11, a rotation shaft 36 is coupled to one side (upper end side herein) of the ultrasonic transducer 18 so that an axis thereof is aligned with an axis of the ultrasonic resonator 16. A slip ring 37 is provided at an intermediate position of the rotation shaft 36 in the axial direction (longitudinal direction), and a driving signal from a high-frequency oscillator 38 is input to the ultrasonic resonator 16 via this slip ring 37. The driving signal input from the high-frequency oscillator 38 via the slip ring 37 is transmitted to the ultrasonic resonator 16 by a signal line (not illustrated) passing through an inside of the rotation shaft 36.

An output shaft 40 of a rotation drive source 39 (such as an electric motor) that rotates the ultrasonic resonator 16 (coupled structure of the first booster 14, the ultrasonic horn 13, and the second booster 15) together with the ultrasonic transducer 18 is coupled to one side of the rotation shaft 36 via a non-contact magnetic joint 41 serving as an example of a non-contact joint. This non-contact magnetic joint 41 includes a drive side magnetic force portion 42 attached to the other end portion of the output shaft 40 of the rotation drive source 39, and a driven side magnetic force portion 43 attached to one end portion of the rotation shaft 36, the driven side magnetic force portion opposing the drive side magnetic force portion 42. A conventionally known structure is favorably used for the non-contact magnetic joint 41 (the drive side magnetic force portion 42 and the driven side magnetic force portion 43). By attracting force generated between a permanent magnet (not illustrated) of the drive side magnetic force portion 42 and a permanent magnet (not illustrated) of the driven side magnetic force portion 43 which are arranged so that magnetic pole surfaces of reversed polarities oppose each other, the drive side magnetic force portion 42 and the driven side magnetic force portion 43 are coupled to each other in a non-contact manner. Thereby, rotation power from the rotation drive source 39 is transmitted from the output shaft 40 to the rotation shaft 36 via the non-contact magnetic joint 41, and it is possible to rotate the ultrasonic resonator 16 together with the ultrasonic transducer 18. In such a way, a portion between the rotation shaft 36 and the output shaft 40 of the rotation drive source 39 is coupled via the non-contact magnetic joint 41. Thus, even when a position of the axis of the ultrasonic resonator 16 (rotation shaft 36) is misaligned with an axis of the output shaft 40 or the axis is tilted, it is possible to maintain a smooth rotation state without interfering with each other.

At the time of performing machining (such as cutoff, cutting, and grinding) by the ultrasonic machining device 11 configured as above, by rotating the ultrasonic resonator 16 by the rotation drive source 39, the cutting blade 12 attached to the ultrasonic horn 13 (outer periphery of the base portion 20) is rotated. At the same time, due to oscillation produced by the ultrasonic transducer 18, as illustrated in FIG. 2, the standing waves (stationary waves) SW of ultrasonic oscillation (oscillation in the axial direction) are generated in the ultrasonic resonator 16, and ultrasonic oscillation of the cutting blade 12 is generated in the radial direction (direction of the arrow a) by the ultrasonic horn (R/L converter) 13. Here, as described above, the axial length of the ultrasonic horn 13 is equal to one half of the wavelength T of the standing waves SW generated in the ultrasonic resonator 16 (T/2), and the axial length of each of the first and second boosters 14, 15 is equal to one half of the wavelength T of the standing waves SW generated in the ultrasonic resonator 16 (T/2). Thereby, it is possible to compactify (minimize) the ultrasonic resonator 16. In addition, damping of the standing waves SW in the ultrasonic resonator 16 is reduced, so that it is possible to efficiently form the standing waves SW.

At this time, positions of the free end surface 17 on one side of the first booster 14 (the opposite side to the ultrasonic horn 13), both end surfaces of the ultrasonic horn 13 (connection end surfaces of the ultrasonic horn 13 and the first and second boosters 14, 15), and a free end surface 46 on the other side of the second booster 15 (the opposite side to the ultrasonic horn 13) are antinodes (AN) of the standing waves SW, and positions of respective center portions of the first booster 14, the ultrasonic horn 13, and the second booster 15 in the axial direction (longitudinal direction) are nodes of the standing waves SW. Therefore, by corresponding positions of an axially center portion of the base portion 20 of the ultrasonic horn 13 and the support portion 33 respectively to positions of the nodes of the standing waves SW, ultrasonic oscillation is effectively utilized, and it is possible to oscillate the base portion 20 of the ultrasonic horn 13 serving as an R/L converter in the radial direction (direction of the arrow a) which is orthogonal to the axial direction of the ultrasonic horn 13. By attaching the cutting blade 12 to the outer periphery of the base portion 20 to align with the axially center portion of the base portion 20 (position of the node of the standing waves SW), it is possible to oscillate the cutting blade 12 in the radial direction together with the base portion 20. At this time, in a widthwise center portion of an outer peripheral surface of the disc-shaped base portion 20, it is also possible to attach the cutting blade 12 to an annular projecting portion (not illustrated) provided along the outer peripheral surface.

In particular, since the space portion 29 passing through the base portion 20 in the axial direction is formed in the axis of the ultrasonic horn 13, not only is the outer periphery of the base portion 20 oscillated to the outer side in the radial direction, but also an inner wall 47 of the space portion 29 is oscillated to the inner side in the radial direction (inner side of the space portion 29). Freedom of oscillation is thus increased, large amplitudes are obtained in the radial direction of the ultrasonic horn 13 (base portion 20), and it is possible to oscillate the cutting blade 12 attached to the outer periphery of the base portion 20 in the radial direction (direction of the arrow a) and efficiently perform machining. Thus, it is possible to enhance utilization efficiency of energy generated by the ultrasonic transducer 18. Even when the inner wall 47 of the space portion 29 is oscillated to the inner side in the radial direction (inner side of the space portion 29) due to oscillation generated in the ultrasonic resonator 16 (base portion 20) at the time of machining, the inner wall 47 and the first and second male screw portions 25, 26 are not brought into contact, and do not interfere with each other in the space portion 29. Thus, it is possible not only to prevent generation of abnormal noise, but also to effectively prevent breakage of the through hole 23 and the first and second male screw portions 25, 26 due to abrasion, etc. Therefore, it is possible to extend the life of the ultrasonic resonator 16. The space portion 29 has the axial length equal to or more than the axial length of the base portion 20 and passes through the base portion 20 in the axial direction. Thus, even when the positions of the nodes of the standing waves SW are displaced in the axial direction of the base portion 20 (left and right direction of FIG. 2) due to an influence of a dimensional error, etc., of the portions of the ultrasonic horn 13, the positions of the nodes of the standing waves SW overlap with the space portion 29, and the inner wall 47 and the first and second male screw portions 25, 26 are not brought into contact, and do not interfere with each other due to oscillation of the base portion 20. Therefore, it is possible to effectively utilize oscillation energy generated in the ultrasonic horn 13.

When the axial length of each of the first and second boosters is equal to the natural-number multiple of one half of the wavelength T of the standing waves generated in the ultrasonic resonator (T/2), the positions of the free end surface on one side of the first booster and the free end surface on the other side of the second booster are the antinodes of the standing waves, and it is possible to obtain the same operations and effects as described above. Therefore, based on an oscillation frequency of ultrasonic waves used, by adjusting (selecting) the respective axial lengths of the ultrasonic horn and the first and second boosters within a range which satisfies the relationship described above, it is possible to easily generate the standing waves.

Next, modified examples of the fastening structure of the ultrasonic resonator will be descried.

Figure 3:
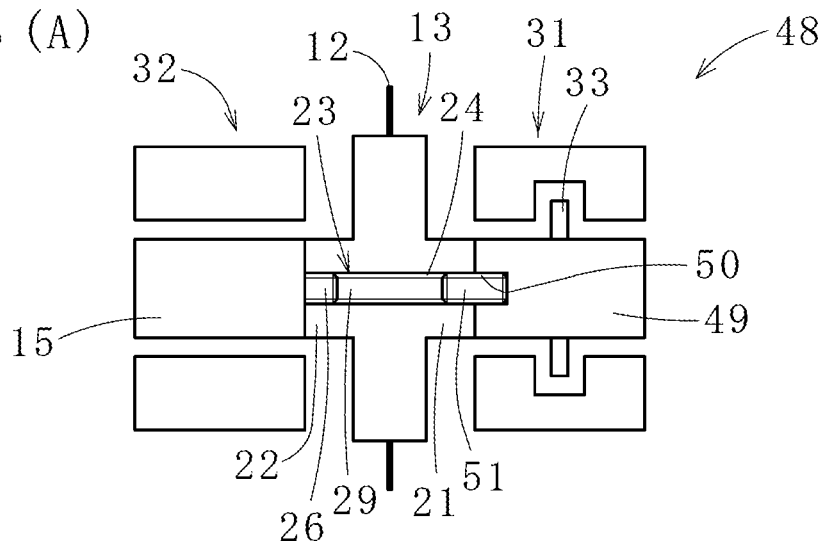
FIG. 3(A) is a major part sectional front view illustrating a first modified example of the fastening structure of the ultrasonic resonator.
FIG. 3(B) is a major part sectional front view illustrating a second modified example of the fastening structure of the ultrasonic resonator.
FIG. 3(C) is a major part sectional front view illustrating a third modified example of the fastening structure of the ultrasonic resonator.
Figure 3:
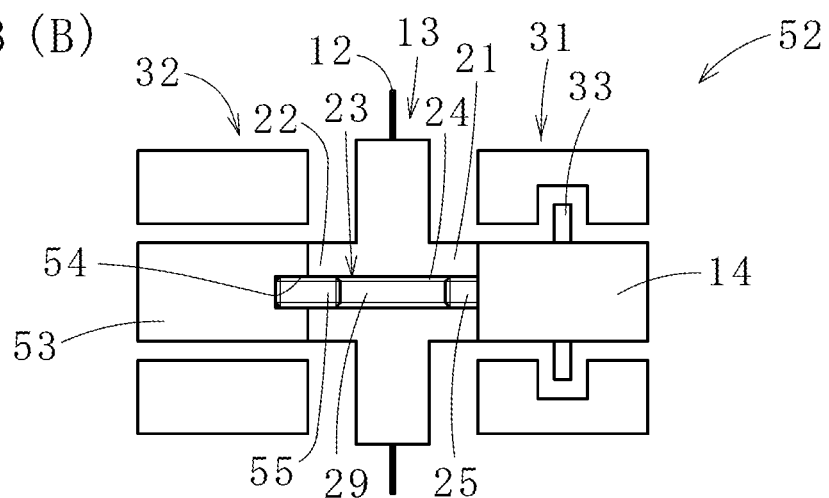
Figure 3:
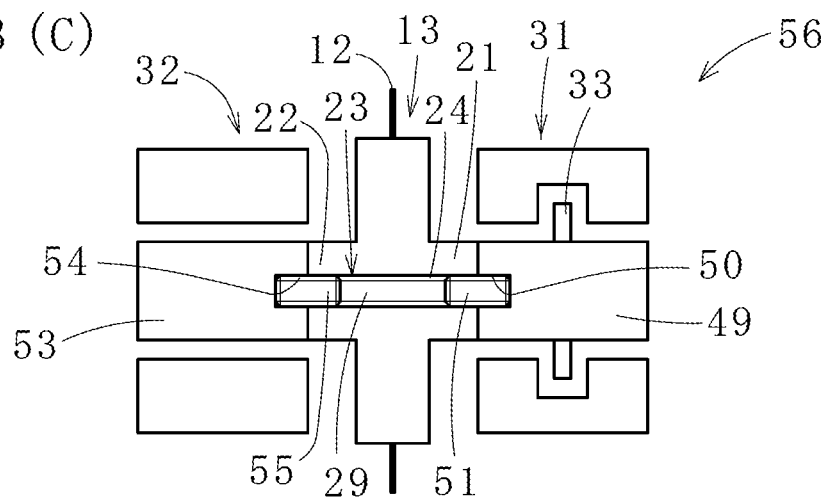

A fastening structure 48 of an ultrasonic resonator of a first modified example illustrated in FIG. 3(A) is different from the fastening structure 10 of the ultrasonic resonator in a point that a first booster 49 has a first male screw portion (screw with no head) 51 attached to the ultrasonic horn 13 side of an axis of the first booster 49 via a coupling female screw portion 50 and screwed into the female screw portion 24 so as to be not more than the axial length of the first projecting portion 21.

A fastening structure 52 of an ultrasonic resonator of a second modified example illustrated in FIG. 3(B) is different from the fastening structure 10 of the ultrasonic resonator in a point that a second booster 53 has a second male screw portion (screw with no head) 55 attached to the ultrasonic horn 13 side of an axis of the second booster 53 via a coupling female screw portion 54 and screwed into the female screw portion 24 so as to be not more than the axial length of the second projecting portion 22.

A fastening structure 56 of an ultrasonic resonator of a third modified example illustrated in FIG. 3(C) is different from the fastening structure 10 of the ultrasonic resonator in a point that a first booster 49 has a first male screw portion (screw with no head) 51 attached to the ultrasonic horn 13 side of an axis of the first booster 49 via a coupling female screw portion 50 and screwed into the female screw portion 24 so as to be not more than the axial length of the first projecting portion 21, and a second booster 53 has a second male screw portion (screw with no head) 55 attached to the ultrasonic horn 13 side of an axis of the second booster 53 via a coupling female screw portion 54 and screwed into the female screw portion 24 so as to be not more than the axial length of the second projecting portion 22. With any of the modified examples, it is possible to obtain the same operations and effects as the fastening structure 10 of the ultrasonic resonator.

In the present embodiment and the modified examples thereof, the female screw portion 24 is formed over the entire length of the through hole 23. However, as long as female screw portions are respectively formed from opening ends on both sides of the through hole (one side and the other side in the longitudinal direction) by predetermined lengths to conform to lengths of the first and second male screw portions, it is possible to fasten the first and second boosters to one side and the other side of the ultrasonic horn in the axial direction, and form the space portion passing through the base portion in the axial direction. Thus, it is possible to obtain the same operations and effects as the fastening structure 10 of the ultrasonic resonator.

The present invention is described above with reference to the embodiment. However, the present invention is not limited at all to the configurations described in the above embodiment but includes other embodiments and modified examples to be thought of within the scope of matters described in the claims.

For example, in the above embodiment, the air (gas) bearings are used as the first and second bearing portions. However, in a case where the ultrasonic resonator is supported on both sides, the first and second bearing portions may be capable of respectively rotatably holding the first and second boosters. A mechanical bearing (for example, a rolling bearing such as a ball bearing) may be used as the first bearing portion and an air (gas) bearing may be used as the second bearing portion, or mechanical bearings (for example, rolling bearings such as ball bearings) may be used as the first and second bearing portions. In a case where a mechanical bearing is used as the first and/or second bearing portion, desirably, a support portion provided at the position of the node of the standing waves in the first and/or second booster is fixed to a cylindrical inner shell inside which the first and/or second booster is fixed in a concentric manner, the inner shell to be rotated together with the ultrasonic resonator, and the inner shell is rotatably supported by the mechanical bearings.

In the above embodiment, the ultrasonic transducer is attached to the first booster. However, the ultrasonic transducer may be attached to the second booster. In place of the configuration that the ultrasonic resonator is supported on both sides by the first and second bearing portions that respectively rotatably hold the first and second boosters as in the above embodiment, the ultrasonic resonator may be cantilevered and supported by a bearing portion that rotatably holds any one of the first and second boosters to which the ultrasonic transducer is coupled. The rotation drive source is connected to the ultrasonic transducer. As the bearing portion in this case, an air (gas) bearing may be used or a mechanical bearing (for example, a rolling bearing such as a ball bearing) may be used.

Further, in the above embodiment, the rotation drive source is indirectly coupled to the rotation shaft via the non-contact magnetic joint serving as an example of a non-contact joint. However, the rotation drive source is only required to be capable of rotating the ultrasonic resonator. The rotation drive source may be directly coupled to the rotation shaft, or the rotation drive source can be coupled to the rotation shaft via a flexible joint.

In the above embodiment, arrangement is made so that the axis of the ultrasonic resonator is directed toward the vertical direction in order to make the second booster side where the ultrasonic transducer is not coupled vertically downward. However, arrangement may be made so that the axis of the ultrasonic resonator is tilted in order to make the second booster side obliquely downward, or arrangement may be made so that the axis of the ultrasonic resonator is directed toward the horizontal direction.

INDUSTRIAL APPLICABILITY

With the fastening structure of the ultrasonic resonator according to the present invention, by forming the female screw portion into which the first and second male screw portions provided in the axes of the first and second boosters are screwed in the through hole provided in the axis of the ultrasonic horn, it is possible to easily accurately align the axes of the ultrasonic horn and the first and second boosters.

Since the leading ends of the first and second male screw portions are not brought into contact with each other inside the through hole and the space portion passing through the base portion in the axial direction is formed in the axis of the ultrasonic horn, it is possible to increase amplitudes in the radial direction in the base portion of the ultrasonic horn and efficiently perform machining with the cutting blade attached to the outer periphery of the base portion. Thus, it is possible to enhance utilization efficiency of energy generated by the ultrasonic transducer. In addition, the first and second male screw portions are not brought into contact, and do not interfere with each other due to oscillation generated in the ultrasonic resonator at the time of machining. Thus, it is possible to prevent generation of abnormal noise, and effectively prevent breakage of the through hole and the first and second male screw portions due to abrasion, etc. Therefore, it is possible to further enhance utilization efficiency.

REFERENCE SIGNS LIST

10: Fastening structure of ultrasonic resonator
11: Ultrasonic machining device
12: Cutting blade
13: Ultrasonic horn
14: First booster
15: Second booster
16: Ultrasonic resonator
17: Free end surface
18: Ultrasonic transducer
20: Base portion
21: First projecting portion
22: Second projecting portion
23: Through hole
24: Female screw portion
25: First male screw portion
26: Second male screw portion
27, 28: Leading end
29: Space portion
30: Holder
31: First bearing portion
32: Second bearing portion
33: Support portion
36: Rotation shaft
37: Slip ring
38: High-frequency oscillator
39: Rotation drive source
40: Output shaft
41: Non-contact magnetic joint
42: Drive side magnetic force portion
43: Driven side magnetic force portion
46: Free end surface
47: Inner wall
48: Fastening structure of ultrasonic resonator
49: First booster
50: Coupling female screw portion
51: First male screw portion (screw with no head)
52: Fastening structure of ultrasonic resonator
53: Second booster
54: Coupling female screw portion
55: Second male screw portion (screw with no head)
56: Fastening structure of ultrasonic resonator

The invention claimed is:

1. A fastening structure of an ultrasonic resonator having an ultrasonic horn which includes a cutting blade on an outer periphery, and first and second boosters respectively coupled to one side and the other side of the ultrasonic horn in the axial direction, the ultrasonic resonator that, by ultrasonic standing waves generated with an ultrasonic transducer coupled to a free end surface of any one of the first and second boosters as a drive source, while oscillating the ultrasonic horn serving as an R/L converter in the radial direction which is orthogonal to the axial direction of the ultrasonic horn, rotates on an axis of the ultrasonic horn and performs ultrasonic machining, wherein the ultrasonic horn has a base portion, first and second projecting portions respectively formed on one side and the other side of the base portion in the axial direction, a through hole passing through the ultrasonic horn in the axial direction through axes of the base portion and the first and second projecting portions, and female screw portions respectively formed from opening ends on both sides of the through hole by predetermined lengths or a female screw portion formed over the entire length of the through hole, the first booster has a first male screw portion formed or attached on the ultrasonic horn side of an axis of the first booster and screwed into the female screw portion, the second booster has a second male screw portion formed or attached on the ultrasonic horn side of an axis of the second booster and screwed into the female screw portion, the ultrasonic horn and the first and second boosters are fastened coaxially while aligning the respective axes with each other, leading ends of the first and second male screw portions are not brought into contact with each other inside the through hole, a space portion surrounded by an inner wall of the through hole and the leading ends of the first and second male screw portions is formed in the axis of the ultrasonic horn, a position of a node of the standing waves overlaps with the space portion in an axially center portion of the base portion, and the cutting blade is attached to an outer periphery of the base portion.

2. The fastening structure of the ultrasonic resonator according to claim 1, wherein a length of the first male screw portion is formed to be not more than an axial length of the first projecting portion, a length of the second male screw portion is formed to be not more than an axial length of the second projecting portion, and the space portion passes through the base portion in the axial direction and has an axial length equal to or more than an axial length of the base portion.

3. The fastening structure of the ultrasonic resonator according to claim 2, wherein
an axial length of the ultrasonic horn is equal to one half of a wavelength of the standing waves, and an axial length of each of the first and second boosters is equal to the natural-number multiple of one half of the wavelength of the standing waves.

4. The fastening structure of the ultrasonic resonator according to claim 2, wherein
the first and second projecting portions are respectively formed into a columnar shape, a diameter and an axial length of the first projecting portion are respectively equal to a diameter and an axial length of the second projecting portion, and a diameter of the through hole is within a range from one tenth to one half of the diameter of each of the first and second projecting portions.

5. An ultrasonic machining device comprising the fastening structure of the ultrasonic resonator according to claim 2.

6. The ultrasonic machining device according to claim 5, wherein
the ultrasonic resonator is cantilevered and supported by a bearing portion that rotatably holds only any one of the first and second boosters to which the ultrasonic transducer is coupled.

7. The ultrasonic machining device according to claim 5, wherein
the ultrasonic resonator is supported on both sides by first and second bearing portions that respectively rotatably hold the first and second boosters.

8. The fastening structure of the ultrasonic resonator according to claim 1, wherein
an axial length of the ultrasonic horn is equal to one half of a wavelength of the standing waves, and an axial length of each of the first and second boosters is equal to the natural-number multiple of one half of the wavelength of the standing waves.

9. The fastening structure of the ultrasonic resonator according to claim 1, wherein
the first and second projecting portions are respectively formed into a columnar shape, a diameter and an axial length of the first projecting portion are respectively equal to a diameter and an axial length of the second projecting portion, and a diameter of the through hole is within a range from one tenth to one half of the diameter of each of the first and second projecting portions.

10. An ultrasonic machining device comprising the fastening structure of the ultrasonic resonator according to claim 1.

11. The ultrasonic machining device according to claim 10, wherein
the ultrasonic resonator is cantilevered and supported by a bearing portion that rotatably holds only any one of the first and second boosters to which the ultrasonic transducer is coupled.

12. The ultrasonic machining device according to claim 10, wherein
the ultrasonic resonator is supported on both sides by first and second bearing portions that respectively rotatably hold the first and second boosters.

* * * * *